United States Patent [19]
Hable et al.

[11] Patent Number: 5,690,291
[45] Date of Patent: Nov. 25, 1997

[54] DATA STORAGE DEVICE WITH BASEPLATE FOR MODIFIED THRUST SURFACE DRAG

[75] Inventors: Mary R. Hable, Stillwater, Minn.; James C. Anderson, Oxnard, Calif.; Kam W. Law, Woodbury, Minn.

[73] Assignee: Imation Corp., Oakdale, Minn.

[21] Appl. No.: 646,413

[22] Filed: May 7, 1996

[51] Int. Cl.⁶ .................................................. G11B 23/087
[52] U.S. Cl. .................................. 242/340; 242/346.2
[58] Field of Search ..................................... 242/340, 342, 242/346, 346.2, 347, 352.4; 360/130.21, 132

[56] References Cited

U.S. PATENT DOCUMENTS

| | | |
|---|---|---|
| 3,692,255 | 9/1972 | von Behren . |
| 3,837,599 | 9/1974 | Souza . |
| 4,254,923 | 3/1981 | Ishida et al. ............. 242/346.2 |
| 4,640,473 | 2/1987 | Aoyama ................... 242/346.2 |
| 5,346,155 | 9/1994 | Alexander et al. ........... 242/342 |
| 5,416,659 | 5/1995 | Saitou et al. ............... 242/342 |

*Primary Examiner*—John P. Darling
*Attorney, Agent, or Firm*—Charles L. Dennis, II

[57] ABSTRACT

A data storage device is provided with an area on the surface of the baseplate adjacent a thrust bearing surface of at least one rotating component of the device is modified to control interface friction between the component and the baseplate. The surface quality is enhanced by altering the roughness of the surface by embossing or machining the baseplate, preferably in areas beneath the rotating component.

14 Claims, 3 Drawing Sheets

DATA STORAGE DEVICE WITH BASEPLATE FOR MODIFIED THRUST SURFACE DRAG

CROSS-REFERENCE TO RELATED APPLICATION

This application claims priority to U.S. Provisional patent application Ser. No. 60/004,929 filed Oct. 6, 1995.

BACKGROUND OF THE INVENTION

1. Field of the Invention

The present invention relates to data storage devices with rotating members. More particularly, the invention relates to a baseplate for a data storage device which enables the device to operate with reduced drive torque and/or enhanced tape tension. Even more particularly, the present invention relates to a baseplate for a data storage device, all or a part of which has enhanced surface quality to modify interface friction between the baseplate and the rotating members in the device.

2. Description of Related Art

A widely used medium for storing digitally encoded data is the data cartridge, which typically comprises a pair of tape reels and a length of magnetically recordable tape. The tape is attached to the reels so that it may be transported past writing or reading transducers while being wound from one reel to the other. In the data cartridge disclosed by yon Behren in U.S. Pat No. 3,692,255, rotation of the reels is provided by an elastic belt which applies tractive force to the peripheries of the two tape reels. Suitable tension is imparted to the tape by the difference in tension of the elastic belt at various points along its length. Belt tension, and hence tape tension, is further enhanced by passing the belt over one or more additional rollers, referred to in the art as corner rollers, which apply a controlled amount of drag force to the belt. The cartridge belt also passes over a drive roller which is driven by torque applied through a corresponding drive roller in a tape drive apparatus.

The rotating components of the cartridge, the tape reels, the drive roller, and the corner rollers, are rotatably mounted on shafts which are attached to a rigid baseplate. The baseplate is typically a flat aluminum plate, although baseplates of other materials are also known. The lateral loadings imposed on the shafts by the belt tension and the force of the tape drive roller against the cartridge drive roller tend to bend the shafts away from their perpendicular orientation, so it is desirable to reduce the bending moment on the shafts by locating the rotating components as near as possible to the baseplate. In addition, locating the rotating components near to the baseplate makes the cartridge more compact.

However, this reduced clearance results in increased interface friction between the thrust bearing surfaces of the rotating components and the baseplate. In addition, during operation of the cartridge the lubricant typically used at the interface between each rotating member and its respective shaft occupies the small clearances between the thrust bearing surfaces of the rotating members and the baseplate, and interface friction may result from the shear stresses and contact generated. The interface friction between the thrust bearing surface of each rotating component and the baseplate, referred to collectively as thrust surface drag, increases the torque required to rotate each component.

It is well known that the thrust surface drag produced at the interface between the rotating components and the baseplate contributes to the overall drive force and/or tape tension required to operate the cartridge. There is an ongoing need to reduce the drive torque required by data cartridges, to allow smaller drive motors to be used, reducing power consumption and heat generation by the cartridge drive. Therefore, control of the drag-producing effects of interface friction between rotating members and the baseplates of data cartridges would be highly desirable. The need may also arise to control tape tension in the data storage device by increasing or decreasing the interface friction between the appropriate rotating components and the cartridge baseplate.

SUMMARY OF THE INVENTION

The present invention provides a data storage device in which all or a part of the surface of the baseplate adjacent the thrust bearing surfaces of the rotating components of the device is modified to control interface friction between the component and the baseplate. This modification alters the thrust surface drag produced by each component, and controls the overall drive force and/or tape tension required to operate the data storage device.

In the present invention, the control of interface friction results from enhancing the surface quality of the baseplate, preferably in areas generally beneath each rotating component. The surface quality is enhanced by altering the roughness of the surface by, for example, embossing or machining the baseplate to produce a controlled level of roughness or a pattern in areas beneath a rotating component. The depth of the surface enhancement can be so small as to have substantially only a smoothing or roughening effect at the interface between the thrust bearing surface of the rotating component and the baseplate surface. Or, the depth of the surface enhancement may be sufficient to alter the surface area beneath the rotating component and/or significantly increase the clearance between the component and the baseplate.

In one embodiment, the present invention is a data storage device which includes:

a baseplate with an upper surface and a lower surface;

at least one rotating member mounted for rotation on a shaft affixed to the baseplate, wherein the rotating member has a lower surface adjacent the upper surface of the baseplate, and wherein the surface roughness of the upper surface of the baseplate is controlled to control a thrust surface drag produced by the at least one rotating member.

In another embodiment, the present invention provides a data storage device which includes:

a baseplate with an upper surface and a lower surface;

at least one rotating member mounted for rotation on a shaft affixed to the baseplate, wherein the rotating member has a lower surface adjacent the upper surface of the baseplate;

at least one interface area on the upper surface of the baseplate, wherein the interface area is positioned generally beneath the lower surface of the at least one rotating member; and a non-interface area on the upper surface of the baseplate, wherein the non-interface area is a remainder of the upper surface of the baseplate not within the interface area, wherein the surface roughness of the interface area is sufficiently different from the surface roughness of the non-interface area to alter a thrust surface drag produced by the at least one rotating member.

In yet another embodiment, the interface area includes a substantially annular land portion adjacent a thrust bearing surface of the at least one rotating member, wherein the land portion has a diameter sufficient to provide support for the rotating member, and a substantially annular depressed portion circumferentially arranged about the periphery of the land portion.

The present invention also extends to a method for reducing drive force required to operate a data storage device by reducing the thrust surface drag produced by at least one rotating component in the device. The method includes the step of mechanically treating the interface area beneath the rotating component to reduce the surface area and/or surface roughness thereof compared to a non-interface area of the upper surface of the baseplate.

The present invention may also include a method for smoothing or roughening the baseplate upper surface to control tape tension in the data storage device.

DETAILED DESCRIPTION OF THE PREFERRED EMBODIMENTS

Figure 1:
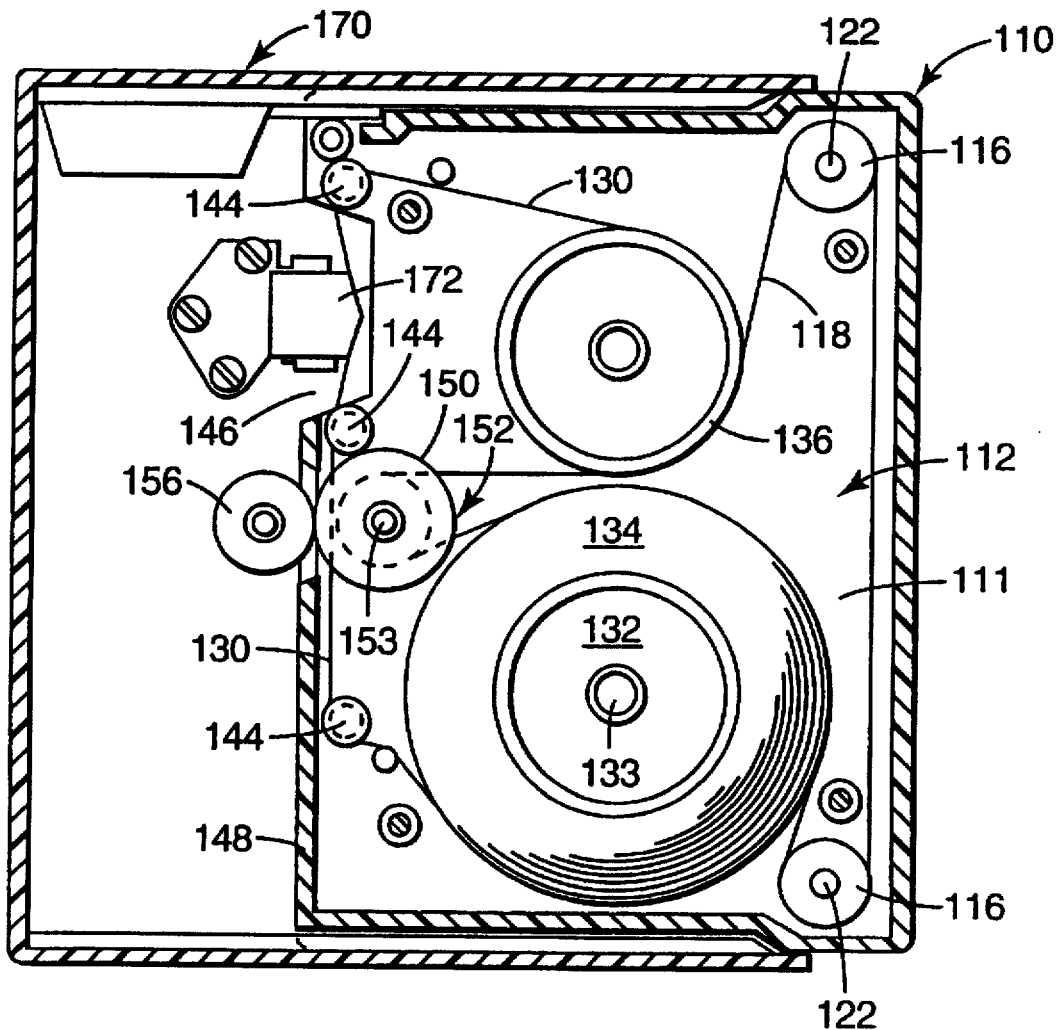
FIG. 1 is a plan view of a drive and a data tape cartridge which may incorporate the baseplate of the invention.

FIG. 1 illustrates an embodiment of a drive 170 and belt driven cartridge 110 in which the rotating members of the invention are used. The recording tape 130 is wrapped in opposite directions around hubs 132 which are mounted for rotation adjacent an upper surface 111 of a cartridge baseplate 112. Each hub 132 rotates on a bearing mounted hub shaft 133 which is generally normal to the baseplate 112. The clearance between a bottom surface of the hubs 132 and the upper surface 111 of the baseplate may optionally be controlled by a wear button (not shown), which rests upon an end surface of the hub shaft 133. The hubs 132 may be held down against shaft 133 by a spring (not shown), which may, for example, be attached to a cover of the tape cartridge. The clearance between the surface of the hub shaft 133 and the bore of the hub 132 is made small to precisely hold the hub in a stable position during rotation. Likewise, the hub shaft 133 is firmly pressed into a hole (not shown) of the baseplate 112, so as to form a fixed member about which the hub 132 can rotate.

The wrapped tape forms a pair of tape packs 134 and 136 which, depending on the direction of tape motion, will function as a supply pack and a take-up pack, respectively. The tape 130 is guided by an arrangement of guide pins 144 past a read/write opening 146 in a front wall 148 of the cartridge.

Drive surfaces 150 are part of or are mounted to a drive roller 152, which is mounted for rotation adjacent the upper surface of the baseplate 112. The drive roller 152 rotates on a drive roller shaft 153 which is generally normal to the baseplate 112. The clearance between a bottom surface of the drive roller 152 and the upper surface 111 of the baseplate is also closely controlled. The clearance between the surface of the drive roller shaft 153 and the bore of the drive roller 152 is also made small to precisely hold the drive roller in a stable position during rotation. Likewise, the drive roller shaft 153 is firmly pressed into a hole (not shown) of the baseplate 112, so as to form a fixed member about which the drive roller 152 can rotate.

Figure 2:
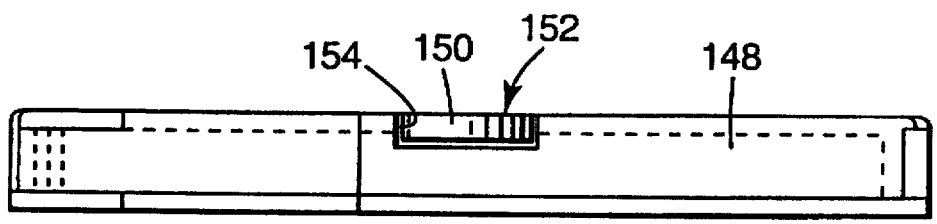
FIG. 2 is a front view of the cartridge of FIG. 1.

As shown in FIGS. 1–2, access opening 154 is formed in the front wall 148 of the cartridge shell adjacent the drive surface 150 of the drive roller 152 to allow access to the drive roller from the outside of the cartridge by a drive puck 156. An elastic belt 118 wraps around the drive surface 150 of drive roller 152, contacts the supply pack 134, wraps around at least two corner rollers 116, contacts the take-up pack 136, and returns to the drive roller 152.

The corner rollers 116, which are also mounted for rotation adjacent the upper surface of the baseplate 112, rotate about corner roller shafts 122 which are generally normal to the baseplate 112. The clearance between a bottom surface of the corner roller 116 and the upper surface 111 of the baseplate is also closely controlled. The clearance between the surface of the corner roller shaft 122 and the bore of the corner roller 116 is also made small to precisely hold the corner roller 116 in a stable position during rotation. Likewise, the corner roller shaft 122 is firmly pressed into a hole (not shown) of the baseplate 112, so as to form a fixed member about which the corner roller 116 can rotate.

The cartridge of the invention may be placed in any conventional tape drive so information may be read or written to the tape in the manner well known in the art. As shown in FIG. 1, a typical drive 170 according to the invention includes a read/write head 172, and a drive motor (not shown) with a suitable drive gear or puck 156. The drive 170 includes all of the many other items necessary for its function, for example, a loading mechanism, circuitry to interpret magnetic signals detected by the head from the tape and to write to the tape, circuitry to position the head relative to the tape, and the like. Such drive elements are well known to one of ordinary skill in the art and therefore will not be further described here.

In the preferred embodiments, the tape is a magnetic recording tape. However, within the scope of the present invention, the term "tape" includes microfilm, paper webs or any other elongated flexible web material which may be transported between a pair of reels.

If a tape cartridge according to the present invention is placed in drive 170 as shown in FIG. 1, the read/write head 172 is positioned adjacent the read/write opening 146, where it has access to the tape 130. Drive puck 156 is positioned against the drive roller 152. To advance the tape in either direction, the drive motor drives the drive puck 156, which in turn drives the drive roller 152. Frictional engagement between the drive roller 152 and the continuous belt 118 causes the belt to move in the driven direction. As the belt 118 moves, it contacts a first tape pack over a given arcuate segment, wraps around the first corner roller and the second corner roller, contacts the second tape pack over a given arcuate segment, and returns to the drive roller. The contact between the belt and the tape packs moves the tape.

Figure 3:
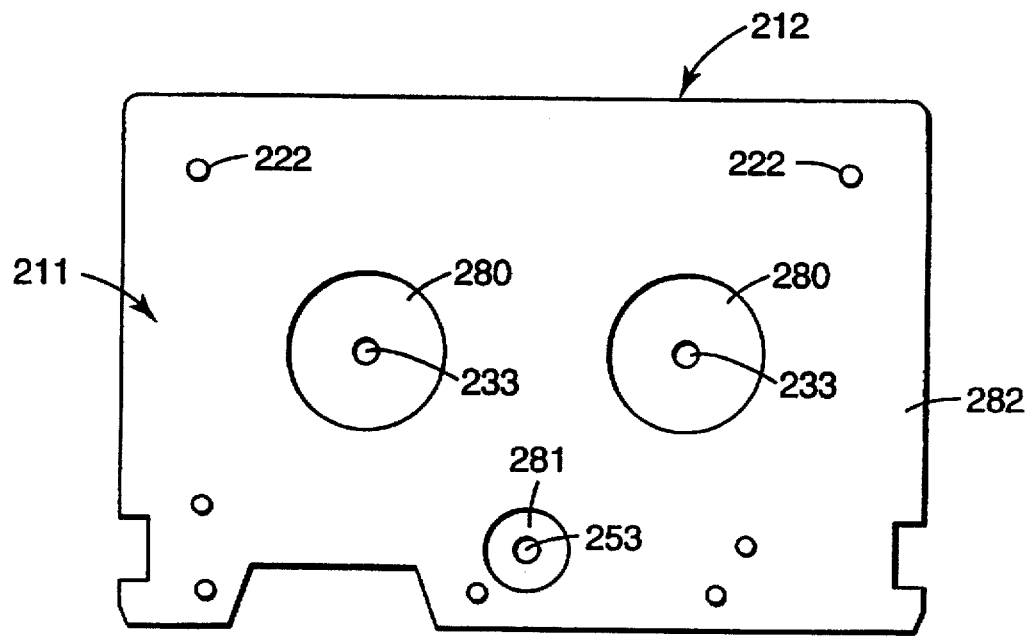
FIG. 3 is a plan view of a cartridge baseplate of the invention.

Referring to FIG. 3, an embodiment of a baseplate 212 is shown which might be used in a data storage device of the present invention. The baseplate 212 is typically made of a metal, preferably aluminum, but may be made of any material sufficiently rigid to support the shafts for the rotating components in the device, such as hubs, drive rollers, corner rollers and the like. In the data tape cartridge illustrated in FIG. 3, the upper surface 211 of the baseplate 212 includes a plurality of orifices (not shown) in which the hub shafts 233, the drive roller shaft 253, and the corner roller shafts 222 are rigidly mounted. A number of regions with enhanced surface quality, referred to as interface regions 280 and 281, are formed on the upper surface 211 of the baseplate and are generally centered about the mounted hub shafts 233 and drive roller shaft 253, respectively, although the present invention is not limited to such an arrangement. The interface regions 280, 281 each have approximately the same overall dimensions as the lower surface of the rotating component (e.g., the hub and the drive roller, respectively) that articulates adjacent the respective interface region on the upper surface 211 of the baseplate so that a thrust surface on the underside of the rotating component interacts with the interface region. The remainder of the upper surface 211 of the cartridge baseplate, referred to herein as the non-interface region 282, lies outside the interface regions 280 and 281.

In the interface regions 280 and 281, the surface of the baseplate has enhanced surface quality, e.g., smoothness or roughness, to effectively control contact surface area. This effective contact surface area is believed to modify interface friction between the lower surfaces of the rotating components and the upper surface of the baseplate. In one embodiment, interface regions 280, 281 have a modified surface roughness provided by machining or by embossing the surface of the baseplate 211 with an appropriately shaped die. The force applied to the tool or die should be sufficient to flatten or create asperities on the surface of the baseplate 211.

Figure 4:
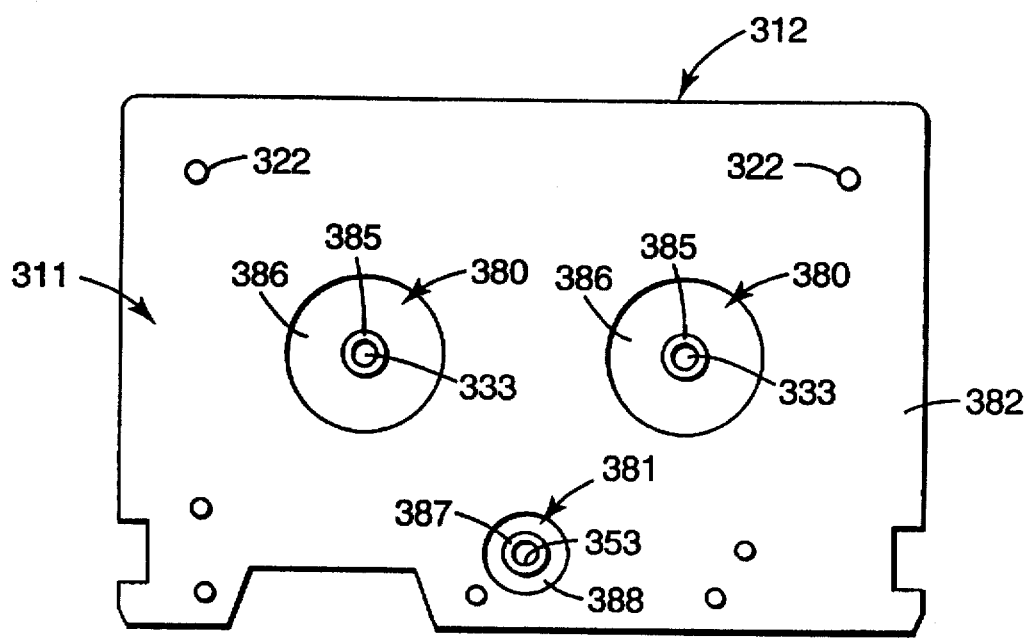
FIG. 4 is a plan view of a cartridge baseplate of the invention.

In another embodiment of the present invention shown in FIG. 4, the interface region 380 includes a land area 385 and a depression area 386. Similarly, the interface region 381 includes a land area 387 and a depression area 388. The land areas 385, 387 and the depression areas 386, 388 may also be produced by machining or by embossing the surface of the baseplate 211 with an appropriately shaped die. The land areas 385, 387 are generally at the surface height of the non-interface region 382 of the baseplate. If desired, the surface roughness of the land areas 385, 387 may be modified by machining, embossing, and the like to control interface friction with the underside of the rotating member. The land areas 385, 387 may have a widely varying shape depending on the structure of the rotating component, but should be shaped to interact smoothly with an adjacent thrust surface on an underside of the rotating component. Control of the ratio of land area to depression area controls the surface area under the rotating component, which may be used to modify the drag torque at the thrust surface on the underside of the component adjacent the upper surface of the baseplate. Ideally, the land area should be of sufficient diameter and thickness to provide support for the thrust surface of the rotating member without causing excessive drag and/or excessive wear on the underside of the component. For example, if drive force reduction in the cartridge is desired, the diameter of the land areas 385, 387 as shown in FIG. 4 should be less than about 50% of the effective diameter of the appropriate rotating components, preferably less than about 25% of the effective diameter.

In making the depressions in the upper surface of the baseplate, the force applied to the tool or die should be sufficient to produce a depression area 386, 388 of about 1% to about 10% of the thickness of the baseplate 312, preferably about 5%. The diameter of the depression areas should preferably be approximately the same as the diameter of the rotating member.

Figure 5:
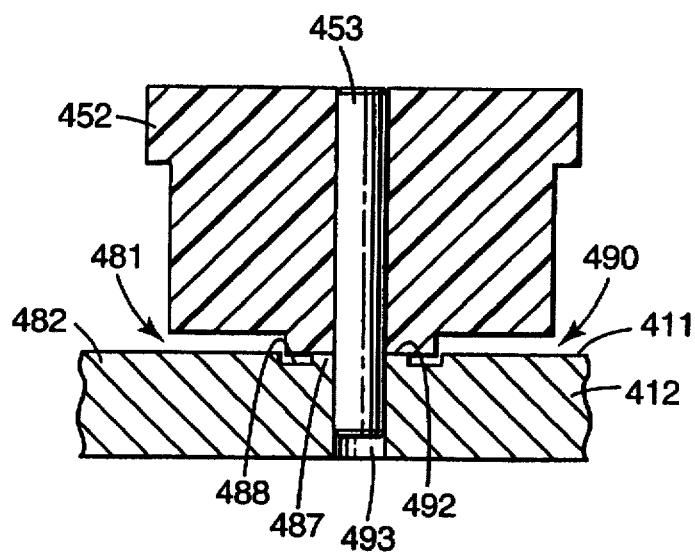
FIG. 5 is a sectional view of a baseplate and rotating member of the present invention.

A sectional view of an embodiment of a typical drive roller in a cartridge and baseplate according to the invention is shown in FIG. 5. The drive roller 452 articulates about the shaft 453 affixed in an orifice 493 in the baseplate 412, and an underside 490 of the drive roller lies adjacent the interface region 481 on the upper surface 411 of the baseplate. The interface region 481 includes a land area 487 adjacent a thrust surface 492 on the underside of the drive roller 452. The land area 487 has a surface height which is approximately the same as the surface height of the non-interface area 482. A depression area 488 extends below the level of the surface of non-interface area 482.

Figure 6:
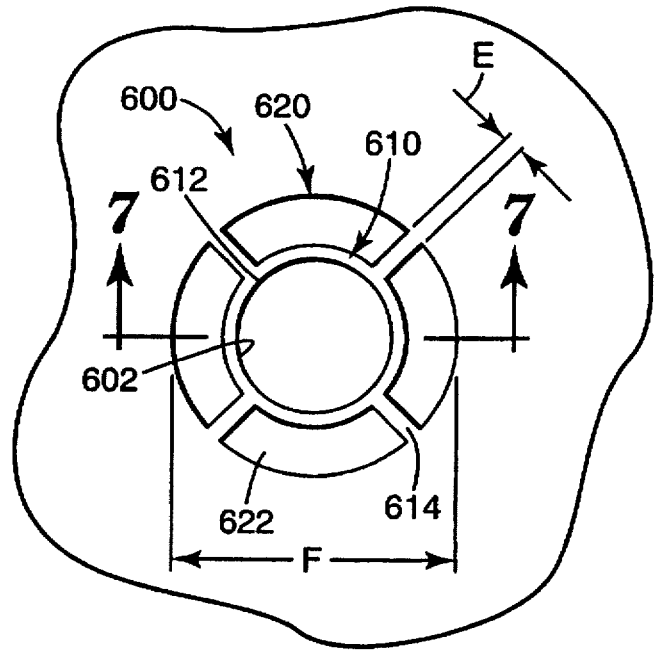
FIG. 6 is a plan view of an embossed region in a baseplate of the invention.
Figure 7:
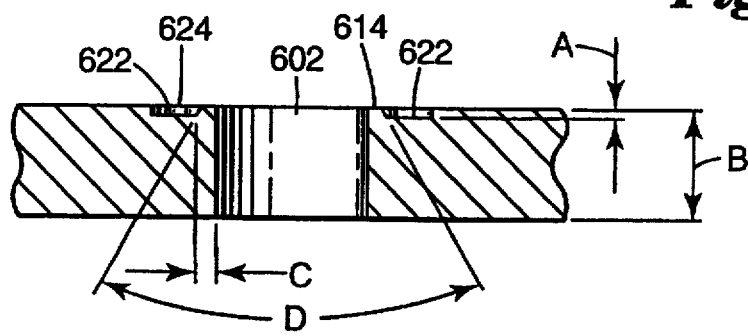
FIG. 7 is a cross-sectional view taken through the embossed region of FIG. 6.

FIGS. 6–7 show an embodiment of an interface region 600 for use under any (not shown) rotating members in a tape cartridge according to the present invention. The interface region 600, which is arranged about an orifice 602 intended to retain a shaft (not shown) for the rotating member, includes a land area 610 which comprises an annular region 612 with a plurality of symmetrically arranged radial arms 614. Circumferentially arranged about the annular region 612 is a depression region 620 which comprises a plurality of arcuate depressions 622 disposed between the radial arms 614. As shown in FIG. 7, in this embodiment, the arcuate depressions 622 preferably have a depth A of about 0.004 inches±0.002 inches (0.0102 cm±0.0051 cm), which is about 5% of the thickness of the baseplate B. If desired, the depressions 622 may include a radius 624, preferably of about 60° as shown in dimension D. Typically, the width C of the annular region 612 is about 0.021 inches (0.053 cm), and its diameter is about 0.113 inches (0.287 cm). As shown in FIG. 6, the width E of the radial arms 614 is normally about 0.012 inches (0.031 cm) to about 0.016 inches (0.041 cm), and the diameter F of the arms 614 is about 0.163 inches (0.414 cm) to about 0.175 inches (0.445 cm).

The machining operations required to produce the regions of enhanced surface quality described above may vary widely depending on the level of surface finish required. These operations are well known in the art, and may include, for example, polishing, buffing, burnishing, honing, lapping, grinding, reaming, drilling and the like.

The present invention will be further described with reference to the following example.

EXAMPLE

Ten data tape cartridges were assembled, each having a baseplate with an embossed region shown in FIGS. 6–7 in the interface regions beneath each tape hub and beneath the drive roller. The embossed regions were produced using an appropriately shaped die mounted in an Arbor press. The handle position of the Arbor press was calibrated to produce depressions of 0.004±0.002 inches (0.0102 cm±0.0051 cm) in the aluminum baseplate. No embossing was included below the corner rollers of the cartridge in this example so as not to disturb the carefully calculated drag produced by these components, which, as is well known, is essential to the operation of the belt-driven data tape cartridge. However, the principles of the present invention would be expected to apply to the corner rollers as well, and, if desired, surface quality enhancements beneath the corner rollers could potentially be used to modify corner roller drag in the data cartridge.

Ten otherwise identical control cartridges were also assembled with conventional non-embossed baseplates.

Minimum tape tension and maximum drive force were measured using a tape tension and drive force tester. The tape tension and drive force tester used a sensor on a post to measure tape tension at the drive head. The post also included a light roller which simulates a drive head. Drive force was measured by monitoring the power output of the tester motor required to move the tape from one end of the cartridge to the other.

A cartridge was inserted into the tape tension and drive force tester, and a conditioning pass at 90 inches per second (ips) (2.29 m per second) was performed. Then the cartridge was run at 25 ips (0.635 m/sec) over 40% of the tape length. The tape speed then automatically changed to 90 ips for operation over the remaining 60% of the tape length. Minimum tape tension values were then determined from data taken over the first 90% of the 25 ips operation. Maximum drive force values were determined from data taken over the last 70% of the 90 ips operation.

Data cartridges which used the embossed baseplates of the invention tended to show reductions in drive force compared to the controls. This reduced drive force means that data cartridges using the embossed baseplates of the invention would be expected to consume less power than conventional cartridges.

In belt driven data cartridge design, a component modification which reduces maximum drive force generally causes an undesirable decrease in minimum tape tension at low speeds. However, the drive force reduction produced by the embossed baseplates of the invention does not appear to create a significant decrease in minimum tape tension.

It will be understood that the exemplary embodiments described herein in no way limit the scope of the invention. Other modifications of the invention will be apparent to those skilled in the art in view of the foregoing description. These descriptions are intended to provide specific examples of embodiments which clearly disclose the present invention. Accordingly, the invention is not limited to the described embodiments or to the use of the specific elements, dimensions, materials or configurations contained therein. All alternative modifications and variations which fall within the spirit and scope of the appended claims are included in the present invention.

We claim:

1. A data storage device, comprising:
    a baseplate with an upper surface and a lower surface;
    at least one rotating member mounted for rotation on a shaft affixed to the baseplate, wherein the rotating member has a lower surface adjacent the upper surface of the baseplate; and
    at least one interface area on the upper surface of the baseplate and generally beneath the lower surface of the at least one rotating member, the interface area comprising:
        a substantially annular land portion adjacent a thrust bearing surface of the at least one rotating member, wherein the land portion has a diameter sufficient to provide support for the rotating member, and a substantially annular depressed portion circumferentially arranged about the periphery of the land portion and wherein the diameter of the land portion is less than about 50% of a diameter of the rotating member.

2. A data storage device as claimed in claim 1, wherein the diameter of the land portion is less than about 25% of the diameter of the rotating member.

3. A method for reducing drive force in a data storage device with a plurality of rotating members mounted for rotation on an upper surface of a baseplate, each rotating member comprising a thrust bearing surface adjacent an interface area on the upper surface of the baseplate, comprising the step of mechanically treating the interface area to alter the surface roughness thereof compared to a non-interface area of the upper surface of the baseplate, said mechanical treatment comprising at least one of pressing, grinding, and burnishing.

4. A method for reducing drive force as claimed in claim 3, wherein the mechanical treatment comprises forming at least one cavity in the interface area.

5. A data storage device, comprising:
    a baseplate with an upper surface and a lower surface;
    at least one rotating member mounted for rotation on a shaft affixed to the baseplate, wherein the rotating member has a lower surface adjacent the upper surface of the baseplate; and
    at least one interface area on the upper surface of the baseplate and generally beneath the lower surface of the at least one rotating member, the interface area comprising:
        a substantially annular land portion adjacent a thrust bearing surface of the at least one rotating member, wherein the land portion has a diameter sufficient to provide support for the rotating member, and a substantially annular depressed portion circumferentially arranged about the periphery of the land portion, the annular land portion further comprising a plurality of arms extending radially outward therefrom, with said depressed portion comprising a plurality of arcuate regions generally between said arms.

6. A data storage device as claimed in claim 5, wherein the depressed portion has a depth of about 5% of the thickness of the baseplate.

7. A data storage device as claimed in claim 5, wherein the arcuate regions of the depressed portion have a depth of about 0.004 inches (0.010 mm) below the upper surface of the baseplate.

8. A data storage device as claimed in claim 5, wherein the thickness of the arms is about 0.012 to about 0.016 inches (0.031 to 0.041 cm).

9. A belt-driven tape cartridge comprising:
    first and second hubs mounted for rotation on an upper surface of a baseplate, wherein a lower surface of each hub is adjacent a hub interface area on the upper surface of the baseplate;
    a drive roller mounted for rotation on the upper surface of the baseplate, wherein a lower surface of the drive roller is adjacent a drive roller interface area on the upper surface of the baseplate;
    at least two corner rollers mounted for rotation on the upper surface of the baseplate, wherein a lower surface of each corner roller is adjacent a corner roller interface area on the upper surface of the baseplate; and
    a non-interface area of the upper surface of the baseplate which does not lie in the interface area;
    wherein the surface roughness of at least one of the hub interface area, the drive roller interface area, and the corner roller interface area is sufficiently different from the surface roughness of the non-interface area to control a thrust surface drag produced by at least one of the hub, the drive roller and the corner roller.

10. A tape cartridge as claimed in claim 9, wherein the surface roughness of at least one of the hub interface area and the drive roller interface area is sufficiently less than the surface roughness of the non-interface area to reduce a thrust surface drag produced by at least one of the hub and the drive roller.

11. A data storage device, comprising:
 a baseplate with an upper surface and a lower surface;
 a pair of tape hubs each mounted for rotation on a hub shaft affixed to the baseplate, wherein the hubs have a lower surface adjacent the upper surface of the baseplate, and a hub interface area of the upper surface of the baseplate beneath the lower surface of each hub;
 a drive roller mounted for rotation on a drive roller shaft affixed to the baseplate, wherein the drive roller has a lower surface adjacent the upper surface of the baseplate, and a drive roller interface area of the upper surface of the baseplate beneath the lower surface of the drive roller; and
 at least two corner rollers each mounted for rotation on a corner roller shaft affixed to the baseplate, wherein the corner rollers have a lower surface adjacent the upper surface of the baseplate, and a corner roller interface area of the upper surface of the baseplate beneath the lower surface of each corner roller;
wherein at least one of said hub interface area, said drive roller interface area, and said corner roller interface area comprise a substantially annular land portion adjacent a thrust bearing surface of said at least one of said hub, drive roller and said corner roller, respectively, said drive roller and said corner roller, respectively, and a substantially annular depressed portion circumferentially arranged about the periphery of the land portion.

12. A data storage device as claimed in claim 11, wherein the annular land portion further comprises a plurality of arms extending radially outward therefrom, and wherein said depressed portion comprises a plurality of arcuate regions between said arms.

13. A data storage device as claimed in claim 11, wherein the depressed portion has a depth of about 5% of the thickness of the baseplate.

14. A tape cartridge as claimed in claim 11, wherein at least one of said hub interface area and said drive roller interface area comprise a substantially annular land portion adjacent a thrust bearing surface of said at least one of said hub and said drive roller, respectively, wherein the land portion has a diameter of about 25% of a diameter of the at least one of said hub and said drive roller, respectively, and a substantially annular depressed portion circumferentially arranged about the periphery of the land portion.

* * * * *